United States Patent

Sakashita et al.

[11] Patent Number: 5,276,109
[45] Date of Patent: Jan. 4, 1994

[54] OPTICAL POLYCARBONATE COMPOSITIONS

[75] Inventors: Takeshi Sakashita; Tomoaki Shimoda, both of Iwakuni; Takashi Nagai, Otake, all of Japan

[73] Assignee: General Electric Company, Pittsfield, Mass.

[21] Appl. No.: 903,698

[22] Filed: Jun. 24, 1992

[30] Foreign Application Priority Data

Jun. 28, 1991 [JP] Japan ................................ 3-159147

[51] Int. Cl.$^5$ ............................................ C08F 283/00
[52] U.S. Cl. ...................................... 525/461; 525/462
[58] Field of Search ............................. 525/461, 462

[56] References Cited

U.S. PATENT DOCUMENTS

| | | | |
|---|---|---|---|
| 3,833,537 | 3/1974 | Jaquiss | 525/461 |
| 4,888,400 | 12/1989 | Boden et al. | 525/462 |
| 4,948,871 | 9/1990 | Fukuoka et al. | 528/481 |
| 5,011,879 | 4/1991 | Uesaka et al. | 524/290 |
| 5,021,521 | 6/1991 | Krabbenhoft et al. | 525/462 |

FOREIGN PATENT DOCUMENTS

| | | |
|---|---|---|
| 0023650 | 2/1981 | European Pat. Off. |
| 0351168 | 1/1990 | European Pat. Off. |
| 0360578 | 3/1990 | European Pat. Off. |
| 434743 | 10/1967 | Switzerland |
| 1049478 | 11/1966 | United Kingdom |

Primary Examiner—John Kight, III
Assistant Examiner—T. Mosley

[57] ABSTRACT

The present invention relates to an optical polycarbonate composition comprising a polycarbonate resin and a boron compound wherein the resulting composition undergoes little coloration during molding, and is capable of forming molded products having excellent transparency.

17 Claims, No Drawings

OPTICAL POLYCARBONATE COMPOSITIONS

FIELD OF THE INVENTION

The present invention relates to optical polycarbonate compositions, and more specifically to optical polycarbonate compositions which undergo little coloration during molding, and which are capable of forming molded products having excellent transparency.

TECHNICAL BACKGROUND OF THE INVENTION

Given their large storage capacity, non-contact readout, ability for high-speed access and other merits, optical disks are being used today in numerous applications, including optical disks for digital data, CD-ROMs, ROMs, compact disks and video disks.

Transparency is a key feature required in the optical substrate of such optical disks, as well as in optical fibers, lenses and supplies for lighting implements. In optical substrates in particular, not only must these have a high light transmittance in the regenerated laser light wavelength region, they must also have the property of transmitting light of wavelengths extending from the visible region to the infrared region.

Properties such as low water absorbance and heat resistance are also required. Polycarbonate resins [A] are commonly used as plastic materials which satisfy these properties.

However, in Prior-art Polycarbonate resins [A] coloration sometimes occurs during molding, as a result of which the polycarbonate [A] resin substrates, lenses and the like obtained have an inferior transparency.

OBJECT OF THE INVENTION

The present invention sets out to resolve the above problems; its aim is to provide optical polycarbonate compositions in which little coloration occurs during molding, and which are able to give molded products having excellent transparency.

GIST OF THE INVENTION

A first optical polycarbonate composition according to the present invention is obtained by formulating

[B] a boron compound in an amount of 0.00001–0.2 part by weight per 100 parts by weight of

[A] a polycarbonate resin having an intrinsic viscosity of 0.30–0.65 dL/g, as measured in 20° C. methylene chloride.

In a first optical polycarbonate composition according to this invention, it is preferable that

[C] an acidic compound having a pKa value of 3 or less and/or a derivative formed from this acidic compound be formulated in an amount of 0.00001–0.2 part by weight together with the boron compound [B].

In the present invention, it is preferable that this acidic compound [C] having a pKa value of 3 or less and/or the derivative formed from this acidic compound be

[C-1] a sulfonic acid compound having a pKa value of 3 or less and/or a derivative formed from this compound.

A second optical polycarbonate composition according to this invention is obtained by formulating

[C-1] a sulfonic acid compound having a pKa value of 3 or less and/or a derivative formed from said compound in an amount of 0.00001–0.0005 part by weight per 100 parts by weight of

[A] a polycarbonate resin having an intrinsic viscosity of 0.30–0.65 dL/g, as measured in 20° C. methylene chloride.

In the above first and second optical polycarbonate compositions, it is preferable that the sulfonic acid compound [C-1] or the derivative formed from this compound be a compound having the formula below:

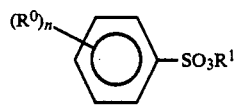

(where $R^0$ is a hydrocarbon group with 1–20 carbons (in which the hydrogens may be substituted with halogens). $R^1$ is a hydrogen or a hydrocarbon group with 1–50 carbons (in which the hydrogens may be substituted with halogens), and n is an integer from 0 to 3).

In addition, it is preferable that the abovedescribed first and second optical polycarbonate compositions include [D] a phosphorus compound and/or [E] an epoxy compound.

This kind of optical polycarbonate composition according to the present invention undergoes little coloration during molding, and the molded products obtained from the compositions are especially well suited to optical applications because of their excellent transparency, heat resistance, water resistance and other properties.

CONCRETE DESCRIPTION OF THE INVENTION

The optical polycarbonate compositions according to the present invention shall now be described more concretely.

First, the polycarbonate resin [A] that forms the first and second optical polycarbonate compositions according to the present invention shall be described.

The polycarbonate resin [A] according to this invention can be prepared, for example, by a method that involves reacting an aromatic organic dihydroxy compound with phosgene in the presence of a solvent and a deoxidizing agent, or by a method that involves heating and melting an aromatic organic dihydroxy compound and a diester carbonate such as diphenyl carbonate, and reacting this at a high temperature and a reduced pressure (melt method). It is especially desirable to use polycarbonate resin prepared by the latter melt method.

Although there are no particular restrictions on this type of aromatic organic dihydroxy compound, the compounds represented by formula [I] below may be cited as examples of these compounds.

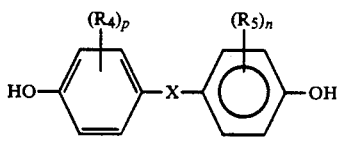

(wherein X is

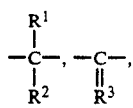

—O—, —S—, —SO— or —SO$_2$—,

R$^1$ and R$^2$ are hydrogen atoms or monovalent hydrocarbon groups; R$^3$ is a divalent hydrocarbon group; R$^4$ and R$^5$, which may the same or different, are halogens or monovalent hydrocarbon groups; and p and q are integers from 0 to 4).

Specific examples that may be cited of the above aromatic dihydroxy compounds include the following compounds: bis(hydroxyaryl)alkanes such as bis(4-hydroxyphenyl)methane. 1,1-bis(4-hydroxyphenyl)ethane, 2,2-bis(4-hydroxyphenyl)propane, 2,2-bis(4-hydroxyphenyl)butane. 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane and 2,2-bis(4-hydroxy-3-bromophenyl)propane; bis(hydroxyaryl)cycloalkanes such as 1,1-bis(hydroxyphenyl)cyclopentane and 1,1-bis(4-hydroxyphenyl)cyclohexane; dihydroxyaryl ethers such as 4,4'-dihydroxydiphenyl ether and 4,4'-dihydroxy-3,3'-dimethylphenyl ether; dihydroxydiarylsulfides such as 4,4'-dihydroxydiphenylsulfide and 4,4'-dihydroxy-3,3'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy-3,3'-dimethyldiphenylsulfone.

Of these, the use of 2,2-bis(4-hydroxyphenyl)propane is especially desirable.

Compounds having formula [II] below can be used as the aromatic organic dihydroxy compounds.

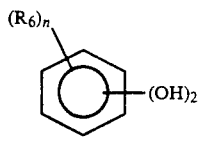

[II]

In above formula [II], R$_6$ may each represent hydrocarbon groups having 1-10 carbons, their halides, or halogens; these groups may be the same or different. Also, n is an integer from 0 to 4.

Examples that may be cited of the aromatic organic dihydroxy compounds represented by formula [II] above include resorcinol and substituted resorcinols such as 3-methylresorcinol, 3-ethylresorcinol, 3-propylresorcinol-3-butylresorcino1,3-t-butylresorcino-1,3-phenylresorcinol, 3-cumylresorcinol, 2,3,4,6-tetrafluororesorcinol and 2,3,4,6-tetrabromoresorcinol; and hydroquinone and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone and 2,3,5,6-tetrabromohydroquinone.

In addition, the 2,2,2',2'-tetrahydro-3,3,3',3'-tetramethyl-1,1'-spirobi[1H-indene]-6,6'-diol having the formula indicated below can also be used as the aromatic organic dihydroxy compound in the present invention.

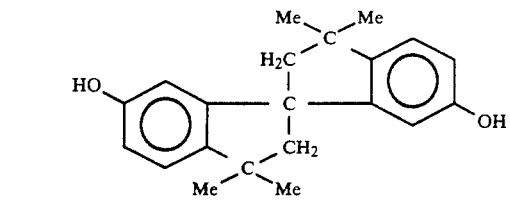

These aromatic organic dihydroxy compounds can be used alone or as combinations thereof.

Specific examples that may be cited of the diester carbonates include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate.

Of the above, the use of diphenyl carbonate is especially preferable.

These diester carbonates may be used alone or as combinations thereof.

Diester carbonates such as the above may contain dicarboxylic acids or dicarboxylates in an amount of no more than 50 mol %, and preferably no more than 30 mol %.

Examples that may be cited of these dicarboxylic acids or dicarboxylates include aromatic dicarboxylic acids such as terephthalic acid, isophthalic acid, diphenyl terephthalate, diphenyl isophthalate; aliphatic dicarboxylic acids such as succinic acid, glutaric acid, adipic acid, pimelic acid, suberic acid, azelaic acid, sebacic acid, decanedioc acid, dodecanedioc acid, diphenyl sebacate, diphenyl decanedioate and diphenyl dodecanedioate; and alicyclic dicarboxylic acids such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate and diphenyl 1,4-cyclohexanedicarboxylate.

Dicarboxylic acids and dicarboxylates such as these may be included alone or as combinations thereof.

Diester carbonates such as the above should normally be used in an amount of 1.0-1.30 moles, and preferably 1.01-1.20 moles, per mole of the aromatic organic dihydroxy compound.

In this invention, when preparing the polycarbonate, a polyfunctional compound having three or more functional groups per molecule may be used along with the above-mentioned aromatic organic dihydroxy compounds and diester carbonates.

These polyfunctional compounds are preferably compounds having phenolic hydroxyl groups or carboxyl groups, with compounds having three phenolic hydroxyl groups being especially desirable. Specific examples that may be cited include 1,1,1-tris(4-hydroxyphenyl)ethane. 2,2',2''-tris(4-hydroxyphenyl)diisopropylbenzene, α-methyl-α,α',α'-tris(4-hydroxyphenyl)-1,4-diethylbenzene α,α',α''-tris(4-hydroxyphenyl)-1,3,5-triisopropylbenzene, fluoroglycine, 4,6-dimethyl-2,4,6-tri(4-hydroxyphenyl)heptane-2, 1,3,5-tri(4- hydroxyphenyl)benzene, 2.2-bis-[4,4-(4,4'-dihydroxyphenyl)cyclohexyl]propane, trimellitic acid, 1,3,5-benzenetricarboxylic acid and pyromellitic acid.

Of these, the use of 1,1,1-tris(4-hydroxyphenyl)ethane, α,α',α''-tris(4-hydroxyphenyl)-1,3,5-triisopropylbenzene or the like is preferable.

The polyfunctional compounds are generally used in an amount of no more than 0.03 mole, preferably 0.001-0.02 mole, and most preferably 0.001-0.01 mole, per mole of the total amount of aromatic organic dihydroxy compound.

When the polycarbonate is prepared, along with the above-described aromatic organic dihydroxy compounds and diester carbonates, compounds able to introduce the following end groups onto the resulting polycarbonate [A] can be used:

hydroxyl groups represented by

HO—   [III]

and or
groups represented by

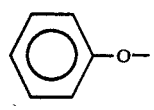
[IV]

and/or
p-tert-butylphenoxy groups represented by

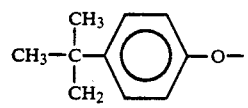
[V]

and/or
p-cumylphenoxy groups (p-phenylisopropylphenoxy groups) represented by

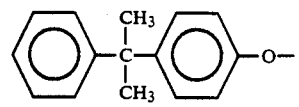
[VI]

and/or
chromanylphenoxy groups represented by

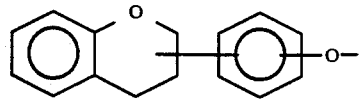
[VII]

(where the aromatic rings or chromanyl groups may be substituted with halogens or alkyls having 1-9 carbons).

In the present invention, specific examples that can be cited of compounds capable of introducing end groups such as those cited above into the polycarbonate molecules thus obtained include the following. In the compounds listed below, the aromatic ring or aliphatic ring may be substituted with halogens or alkyls having 1-9 carbons.

Examples that may be cited of the compounds capable of introducing the phenoxy groups represented by formula [IV] above include phenol and diphenyl carbonate.

Examples that may be cited of the compounds capable of introducing the p-tert-butylphenoxy groups represented by formula [V] above include p-tert-butylphenol, p-tert-butylphenylphenyl carbonate and p-tert-butylphenyl carbonate.

Examples that may be cited of compounds that can introduce the p-cumylphenoxy groups represented by above formula [VI] above include p-cumylphenol, p-cumylphenylphenyl carbonate and p-cumylphenyl carbonate.

Specific examples that may be cited of the chromanylphenoxy groups represented by formula [VII] include the following chromanylphenoxy groups.

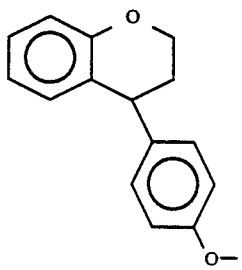
[VIII]

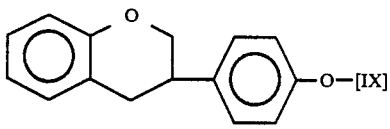
[IX]

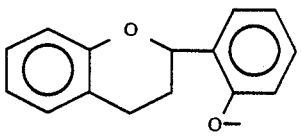
[X]

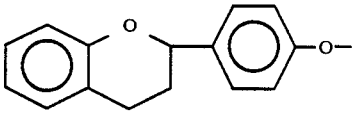
[XI]

Specific examples that may be cited of compounds capable of introducing a chromanylphenoxy group such as that represented by formula [VIII] include chroman compounds such as the following: 2,2,4-trimethyl-4-(4-hydroxyphenyl)chroman, 2,2,4,6-tetramethyl-4-(3,5-dimethyl-4-hydroxyphenyl)chroman, 2,3,4-trimethyl-2-ethyl-4-(3-nonyl-4-hydroxyphenyl)-7-nonylchroman, 2,2,4-trimethyl-4-(3,5-diethyl-4-hydroxy-phenyl)-6-ethylchroman, 2,2,4,6,8-pentamethyl-4-(3,5-dimethyl-4-hydroxyphenyl)chroman, 2,2,4-triethyl-3-methyl-4-(4-hydroxyphenyl)chroman, 2,2,4-trimethyl-4-(3-bromo-4-hydroxyphenyl)chroman, 2,2,4-trimethyl-4-(3-bromo-4-hydroxyphenyl)-6-bromochroman, 2,2,4-trimethyl-4-(3.5-dibromo-4-hydroxyphenyl)-6-bromochroman and 2,2,4-trimethyl-4-(3,5-dibromo-4-hydroxyphenyl)-6,8-dibromochroman.

Of these, the use of 2,2,4-trimethyl-4-(4-hydroxyphenyl)chroman is especially desirable.

Specific examples that may be cited of compounds capable of introducing a chromanylphenoxy group such as that represented by formula [IX] above include chroman compounds such as the following: 2,2,3-trimethyl-3-(4-hydroxyphenyl)chroman, 2,2,3,6-tetramethyl-3-(3,5-dimethyl-4-hydroxyphenyl)chroman, 2,3,4-trimethyl-2-ethyl-3-(3-nonyl-4-hydroxyphenyl)-7- nonylchroman, 2,2,3-trimethyl-3-(3,5-diethyl-4-hydroxy-phenyl)-6-ethylchroman, 2,2,3,6,8-pentamethyl-3-(3,5-dimethyl-4-hydroxyphenyl)chroman, 2,3,3-triethyl-3-methyl-3-(4-hydroxyphenyl)chroman, 2,2,3-trimethyl-3-(3-bromo-4-hydroxyphenyl)-6-bromochroman. 2,2,3-tri-methyl-3-(3,5-dibromo-4-hydroxyphenyl)-6-bromochroman and 2,2,3-trimethyl-3-(3,5-dibromo-4-hydroxyphenyl)-6,8-dibromochroman.

Of these, the use of 2,2,3-trimethyl-3(4-hydroxyphenyl)chroman is especially desirable.

Specific examples that may be cited of compounds capable of introducing a chromanylphenoxy group such as that represented by formula [X] above include chroman compounds such as the following: 2,4,4-trimethyl-2-(2-hydroxyphenyl)chroman, 2,4,4,6-tetramethyl-2-(3,5-dimethyl-2-hydroxyphenyl)chroman, 2,3,4-trimethyl-4-ethyl-2-(3,5-dimethyl-2-hydroxy-phenyl)-7-nonylchroman. 2,4,4-trimethyl-2-(3,5-dimethyl-2-hydroxyphenyl)-6-ethylchroman, 2,4,4,6,8-pentamethyl-2-(3,5-dimethyl-2-hydroxyphenyl)-6-ethylchroman, 2,4,4-trimethyl-2-(3-bromo-2-hydroxyphenyl)chroman, 2,4,4-trimethyl-2-(3-bromo-2-hydroxyphenyl)-6bromochroman, 2,4,4-trimethyl-2-(3,5-dibromo-2-hydroxyphenyl)-6-bromochroman and 2,4,4-trimethyl-2-(3,5-dibromo-2-hydroxyphenyl)-6,8-dibromochroman.

Of these, the use of 2,2,4-trimethyl-2-(2-hydroxyphenyl)chroman is especially desirable.

Specific examples that may be cited of compounds capable of introducing a chromanylphenoxy group such as that represented by formula [XI] above include chroman compounds such as the following: 2,4,4-trimethyl-2-(4-hydroxyphenyl)chroman, 2,4,4,6-tetramethyl-2-(3,5-dimethyl-4-hydroxyphenyl)chroman, 2,4,4-triethyl-2-(4-hydroxyphenyl)chroman, 2,3,4-trimethyl-4-ethyl-2-(3,5-dimethyl-4-hydroxyphenyl)-7-nonylchroman, 2,4,4-trimethyl-2-(3,5-diethyl-4-hydroxyphenyl)-6-ethylchroman, 2,4,4,6,8-pentamethyl-2-(3,5-dimethyl-4-hydroxyphenyl)-6-ethylchroman, 2,4,4-trimethyl-2-(3-bromo-4-hydroxyphenyl)chroman. 2,4,4-trimethyl-2-(3-bromo-4-hydroxyphenyl)-6-bromochroman, 2,4,4-trimethyl-2-(3,5-dibromo-4-hydroxyphenyl)-6-bromochroman and 2,4,4-trimethyl-2-(3,5-dibromo-4-hydroxyphenyl)-6,8-dibromochroman.

Of these, the use of 2,4,4-trimethyl-2-(4-hydroxyphenyl)chroman is especially desirable.

These compounds capable of introducing end groups having the various above-indicated formulas may be used alone or in combination.

The compounds proposed by the present applicant in the specification of Japanese Unpublished Unexamined Patent Application [Tokugan] No. 2-85,218 (1990) can be employed as the catalyst used in the above-described melt process. More specifically, preferable use can be made of the organic acid salts, inorganic acid salts, oxides, hydroxides, hydrides or alcoholates of (a) metals such as alkali metals and alkaline earth metals.

Specific examples of such alkali metal compounds include sodium hydroxidem potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium boron phenylate, sodium benzoate, potassium benzoate, lithium benzoate, disodium hydrogen phosphate, dipotassium hydrogen phosphate, dilithium hydrogen phosphate, the disodium, dipotassium and dilithium salts of bisphenol A, and the sodium, potassium and lithium salts of phenol.

Specific examples of such alkaline earth metal compounds that may be cited include calcium hydroxide. barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

These compounds may be used alone or as combinations thereof.

These alkali metal compounds and/or alkaline earth metal compounds (a) are used in an amount of $1 \times 10^{-8}$ to $1 \times 10^{-3}$ mole, preferably $1 \times 10^{-7}$ to $1 \times 10^{-6}$ mole, and most preferably $1 \times 10^{-7}$ to $8 \times 10^{-7}$ mole, per mole of the aromatic organic dihydroxy compound.

Along with the above-described alkali metal compounds and/or alkaline earth metal compounds (a). it is also possible to use (b) a basic compound as the catalyst.

This basic compound (b) may be, for example, a nitrogen-containing compound. Specific examples that may be cited include ammonium hydroxides having alkyl, aryl, or aralkyl groups, such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($\phi$—$CH_2$-$(Me)_3NOH$); tertiary amines such as trimethylamine, triethylamine, dimethylbenzylamine and triphenylamine; secondary amines having the formula $R_2NH$ (where R is an alkyl such as methyl or ethyl, an aryl group such as phenyl or toluyl, or the like); primary amines having the formula $RNH_2$ (where R is the same as above); and basic salts such as ammonia, tetramethylammonium borohydride ($Me_4NBH_4$), tetrabutylammonium borohydride ($Bu_4NBH_4$), tetrabutylammonium tetraphenylborate ($Bu_4NBPh_4$) and tetramethylammonium tetraphenylborate ($Me_4NBPh_4$).

Of the above, preferable use can be made of tetraalkylammonium hydroxides.

In the present invention, examples that may be cited of the catalyst include combinations of (a) an alkali metal compound and/or an alkaline earth metal compound, and (b) a nitrogen-containing basic compound;

and combinations of (a) an alkali metal compound and/or an alkaline earth metal compound, (b) a nitrogen-containing basic compound, and (c) boric acid or borate.

In cases where a catalyst consisting of this kind of composition is used, it is preferable that the alkali metal compound and/or the alkaline earth metal compound (a) be used in the above-indicated amount, and that the nitrogen-containing basic compound (b) be used in an amount of $1 \times 10^{-6}$ to $1 \times 10^{-1}$ mole, and preferably $1 \times 10^{-5}$ to $1 \times 10^{-2}$ mole per mole of the aromatic organic dihydroxy compound.

In this way, catalyst consisting of a combination of (a) an alkali metal compound and/or an alkaline earth metal compound. and (b) a nitrogen-containing basic compound is able to produce a high-molecular-weight polycarbonate at a high polymerization activity.

With regard to the boric acid or borate (c), these will be described later on as [B] boron compounds.

The polycondensation reaction between an aromatic organic dihydroxy compound and a diester carbonate using this type of catalyst can be carried out under similar conditions as for hitherto-known polycondensation reactions between aromatic organic dihydroxy compounds and diester carbonates. More specifically, the step-one reaction is carried out at a temperature of 80°-250° C., preferably 100°-230° C., and most preferably 120°-190° C. for 0-5 hours, preferably 0-4 hours, and most preferably 0.25-3 hours, and at normal pressure.

Next, the reaction temperature is raised while placing the reaction system under a vacuum, and the reaction between the aromatic organic dihydroxy compound and the diester carbonate is carried out; polycondensation between the aromatic organic dihydroxy compound and the diester carbonate is ultimately carried out under a vacuum of 0.05-5 mmHg and at a temperature of 240°-320° C.

Reactions between aromatic organic dihydroxy compounds and diester carbonates such as these may be carried out as a continuous process or a batch-type process. The reaction apparatus used when carrying out the above reaction may be a tank-type, tube-type, or column-type apparatus.

In polycarbonate resins [A] such as this, it is preferable that the intrinsic viscosity measured in 20° C. methylene chloride be 0.30-0.65 dL/g, and preferably 0.32-0.62 dL/g.

When the intrinsic viscosity is too large, the fluidity decreases, making it necessary to carry out molding at resin temperatures of more than 400° C. Hence, degradation of the resin cannot be avoided, thereby inviting silver streaks and the like, which results in a loss in the transparency of the molded product and other problems.

When the intrinsic viscosity is too low, this invites problems with the physical properties and shape, such as declines in the heat resistance and strength, and a tendency for crystallization.

As noted earlier, it is preferable that the polycarbonate resin [A] have end groups such as those cited below.

Hydroxyl groups represented by

HO—     [III]

and/or
phenoxy groups represented by

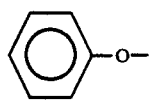

[IV]

and/or
p-tert-butylphenoxy groups represented by

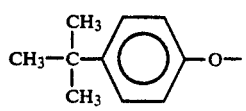

[V]

and/or
p-cumylphenoxy groups (p-phenylisopropylphenoxy groups) represented by

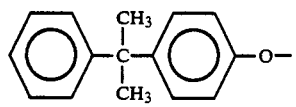

[VI]

and/or
chromanylphenoxy groups represented by

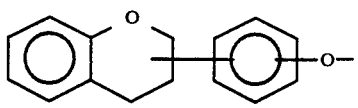

[VII]

(where the aromatic rings or chromanyl groups may be substituted with halogens or alkyls having 1-9 carbons).

In the polycarbonate resin [A] used in this invention, any ratio of the end groups may represented by above formulas [III], [IV], [V], [VI] and [VII], but it is preferable that the ratio of hydroxyl terminals represented by formula [II] be 50% or less, and preferably 30% or less.

In the first optical polycarbonate compositions according to the present invention, a boron compound [B] is formulated into a polycarbonate resin [A] like that described above.

In the second optical polycarbonate composition according to the present invention, a sulfonic acid compound [C-1] having a pKa value of 3 or less, and/or a derivative formed from this compound is formulated.

Compounds having the following formula are preferable for use as the boron compound [B]

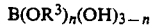

B(OR$^3$)$_n$(OH)$_{3-n}$ where R$^3$ represents hydrogens, aliphatic hydrocarbon groups, alicyclic hydrocarbon groups or aromatic hydrocarbon groups; and n is 1, 2 or 3.

Specific examples that may be cited of boron compounds [B] that form the first optical polycarbonate composition include boric acid, trimethylborate, triethylborate, tributylborate, trihexylborate, triheptylborate, triphenylborate, tritolylborate and trinaphthylborate.

Of these, the use of triphenylborate is preferable.

In the first optical polycarbonate composition according to the present invention, the above-described boron compound [B] is compounded in an amount of 0.00001-0.2 part by weight, and preferably 0.0005-0.02 part by weight, per 100 parts by weight of the polycarbonate resin [A].

This boron compound [B] can be used by adding it beforehand as one component of the catalyst at the time of polymerization; if the necessary amount is added at the time of polymerization, there is no particular need for addition after polymerization.

When the boron compound [B] is formulated into the polycarbonate resin [A] before or after polymerization in the above-indicated amount as one component of the catalyst, coloration of the polycarbonate resin [A] composition during molding can be prevented.

Along with above boron compound [B], it is preferable that an acidic compound [C] having a pKa value of 3 or less and/or a derivative formed from this acidic compound be formulated into the first optical polycarbonate composition according to this invention.

Specific examples that may be cited of acidic compounds [C] having a pKa value of 3 or less such as this include phosphorus acid compounds, sulfonic acid compounds, sulfuric acid, dimethylsulfuric acid and diethylsulfuric acid. Examples that may be cited of derivatives formed from these acidic compounds include esters and salts formed from these compounds.

Examples that may be cited of these phosphoric acid compounds include phosphoric acid, phosphorous acid, hypophosphorous acid, pyrophosphoric acid, and polyphosphoric acid.

These compounds can be used alone or as combinations.

In this invention, preferable examples that may be cited of the acidic acid compound [C] having a pKa value of 3 or less and/or a derivative formed from this acidic acid compound include sulfonic acid compounds [C-1] having a pKa value of 3 or less and/or derivatives thereof.

Preferable use can be made of compounds having formula [XII] below as the sulfonic acid compounds [C-1] having a value of 3 or less and/or derivatives thereof that are preferably formulated in the first compositions and are formulated in the second optical polycarbon compositions.

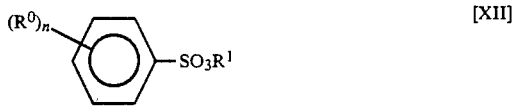

[XII]

(where $R^O$ is a hydrocarbon group with 1-20 carbons (in which the hydrogens may be substituted with halogens). $R^1$ a hydrogen or a hydrocarbon group with 1-50 carbons (in which the hydrogens may be substituted with halogens), and n is an integer from 0 to 3).

The following compounds may be cited as examples of these sulfonic acid compounds or their derivatives: sulfonic acids such as benzenesulfonic acid and p-toluenesulfonic acid; and sulfonates such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate.

Sulfonic acid compounds such as trifluoromethanesulfonic acid, naphthalenesulfonic acid, sulfonated polystyrene and methyl acrylate-styrene sulfonate copolymers may also be used.

These compounds may be used alone or as combinations thereof.

In the first compositions, the amount in which the acidic compound [C] having a pKa value of 3 or less and/or a derivative formed from said acidic compound is compounded should be 0.00001-0.2 part by weight, and preferably 0.00001-0.0005 part by weight, per 100 parts by weight of the polycarbonate resin [A].

In the second compositions, the amount in which the sulfonic acid compound [C-1] having a pKa value of 3 or less and/or a derivative thereof is compounded should be 0.00001-0.0005 part by weight per 100 parts by weight of the polycarbonate resin [A].

In polycarbonate [A] resins in which the abovedescribed acidic compounds [C] having a pKa value of 3 or less and/or derivatives formed from these acidic compounds, and especially sulfonic acid compounds [C-1] and/or derivatives thereof, are formulated in the above amount, the heat resistance is enhanced and the drop in molecular weight at the time of molding is suppressed.

In the present invention, the use of combinations like that indicated below is preferable as the combination of a boron compound [B] and an acidic compound [C] having a pKa value of 3 or less and/or a derivative formed from this acidic compound, which is employed in the first optical polycarbonate composition.

[B] boron compounds: boric acid, triphenylborate;
[C] acidic compounds having pKa value of 3 or less: benzenesulfonic acid, p-toluenesulfonic acid, or their methyl, ethyl, butyl or octyl esters.

A particular feature in polycarbonate [A] resins formulated by combining a boron compound [B] and an acidic compound [C] having a pKa of 3 or less and/or a derivative formed from this acidic compound is that coloration of the polycarbonate composition at the time of molding is prevented.

However, when the boron compound [B] and the acidic compound [C] having a pKa value of 3 or less and/or derivatives of this acidic compound are present in amounts greater than is necessary for use, the water resistance of the polycarbonate composition decreases.

In these first and second optical polycarbonate compositions according to the present invention, it is desirable to use a phosphorus compound [D] as the process stabilizer (antioxidant). Phosphates and phosphites may be used as this phosphorus compound [D].

Specific examples that may be cited of phosphates such as these include trialkylphosphates such as trimethylphosphate, triethylphosphate, tributylphosphate, trioctylphosphate, tridecylphosphate, trioctadecylphosphate, distearylpentaerythrityldiphosphate, tris(2-chloroethyl)phosphate and tris(2,3-dichloropropyl)phosphate; tricycloalkylphosphates such as tricyclohexylphosphate; and triarylphosphates such as triphenylphosphate, tricresylphosphate, tris(nonylphenyl)phosphate and 2-ethylphenyldiphenylphosphate.

Examples that may be cited of phosphites include those compounds having the following formula

P(OR)$_3$ (where R is an alicyclic hydrocarbon group, an aliphatic hydrocarbon group or an aromatic hydrocarbon group; the groups represented by R may be the same or different).

Specific examples that may be cited of compounds having this type of formula include trialkylphosphites such as trimethylphosphite, triethylphosphite, tributylphosphite, trioctylphosphite, tris(2-ethylhexyl)phosphite, trinonylphosphite, tridecylphosphite, trioctadecylphosphite, tristearylphosphite, tris(2-chloroethyl)phosphite and tris(2,3-dichloropropyl)phosphite; tricycloalkylphosphites such as tricyclohexylphosphite; triarylphosphites such as triphenylphosphite, tricresylphosphite, tris(ethylphenyl)phosphite, tris(2,4-di-t-butylphenyl)phosphite, tris(nonylphenyl)phosphite and tris(hydroxyphenyl)phosphite; and arylalkylphospites such as phenyldidecyl-phosphite, diphenyldecylphosphite, diphenylisooctyl-phosphite, phenylisooctylphosphite and 2-ethylhexyl-diphenylphosphite.

Other examples of phosphites that may be cited include distearylpentaerythrityldiphosphite and bis(2,4-di-t-butylphenyl)pentaerythrityldiphosphite.

These compounds may be used alone or as combinations thereof.

Of these, the use of phosphites having the above formula is preferable as the phosphorus compound [D], with the use of aromatic phosphites being even more preferable. The use of tris(2,4-di-t-butylphenyl)phosphite is especially desirable.

In the present invention, the above-described phosphorus compound [D] is added in an amount of 0.1 part by weight or less per 100 parts by weight of the polycarbonate [A] resin.

It is preferable that the first and second optical polycarbonate composition according to the present invention contain also an epoxy compound [E].

In the present invention. compounds having one or more epoxy groups per molecule may be used as the epoxy compound [E]. There is no particular restriction on the amount used, although these are normally used in an amount of 0.001–0.1 part by weight, and preferably 0.001–0.08 part by weight, per 100 parts by weight of the above polycarbonate.

Specific examples that may be cited of epoxy compounds such as these include epoxidized soybean oil, epoxidized linseed oil, phenylglycidyl ether, allylglycidyl ether, t-butylphenylglycidyl ether, 3,4-epoxycyclohexylmethyl-3,4-epoxycyclohexane carboxylate, 3,4-epoxy-6-methylcyclohexylmethyl-3,4-epoxy-6-methylcyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, cyclohexylmethyl-3,4epoxycyclohexane carboxylate, 3,4-epoxy-6-methylcyclohexylmethyl-6-methylcyclohexane carboxylate, bisphenol A diglycidyl ether, tetrabromobisphenol A glycidyl ether, the diglycidyl ester of phthalic acid, the diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycylohexane, octadecyl-2,2-dimethyl-3,4-epoxycyclohexane carboxylate, N-butyl-2,2-dimethyl-3,4-epoxycyclohexane carboxylate, cyclohexyl-2-methyl-3,4-epoxycyclohexane carboxylate, N-butyl-2-isopropyl-3,4-epoxy-5-methylcyclohexane carboxylate, octadecyl-3,4-epoxycyclohexane carboxylate, 2-ethylhexyl-3',4'epoxycyclohexane carboxylate, 4,6-dimethyl-2,3-epoxycyclohexyl-3',4'-epoxycyclohexane carboxylate, 4,5-epoxytetrahydrophthalic anhydride, 3-t-butyl-4,5-epoxytetrahydrophthalic anhydride, diethyl-4,5-epoxy- cis-1,2-cyclohexane dicarboxylate and di-n-butyl-3-t-butyl-4,5-epoxy-cis-1,2-cyclohexane dicarboxylate.

These may be used alone or as mixtures of two or more thereof.

In this invention, there is no particular restriction on the method of adding the phosphorus compound [D] and the epoxy compound [E] to the polycarbonate resin [A]. For example, when the polycarbonate resin [A] is produced by a melt process, the above-mentioned [B], the acidic compound [C] or [C−1], the phosphorus compound [D] and the epoxy compound [E] may be added to the polycarbonate resin [A] in a molten state and kneaded together; alternatively [B], the acidic compound [C] or [C−1], the phosphorus compound [D] and the epoxy compound [E] may be added and stirred into a solution of the polycarbonate resin [A]. More specifically, examples that may be cited of such methods include a method whereby the above-described [B], the acidic compound [C] or [C−1], [D] and [E] are directly added and kneaded, either separately or at the same time, into the polycarbonate resin [A] which is the reaction product obtained with completion of the polycondensation reaction and is present within the reactor or extruder in a molten state; a method whereby the polycarbonate resin [A] obtained is pelletized, and these pellets are fed to a single-screw or twin-screw extruder together with [B], the acidic compound [C], [D] and [E], and these components are melt-kneaded; and a method whereby a solution is prepared by dissolving the polycarbonate obtained in an appropriate solvent such as methylene chloride, chloroform, toluene or tetrahydrofuran, then adding [B], acidic compound [C] and the epoxy compound to this solution, either separately or at the same time.

The order in which the various above-mentioned compounds are added to the polycarbonate resin [A] is of no import.

In polycarbonate compositions obtained by adding an epoxy compound [E] at the same time as the acidic compound, the excess [B] or acidic compound [C] remaining in the polycarbonate composition reacts with the epoxy compound and is thereby neutralized, making it possible to form molded products having an excellent color hue, heat resistance, water resistance and other properties.

In the present invention, additives such as heat stabilizers, weathering stabilizers, parting agents, antistatic agents, slip agents, anti-blocking agents, anti-fogging agents, lubricants, dyes, pigments, natural oils, synthetic oils, waxes, organic fillers and inorganic fillers, may be added to the abovedescribed polycarbonate composition, provided these do not have adverse effects upon the objects of this invention.

In the present invention, it is preferable that polycarbonate compositions like the above be administered a vacuum treatment.

When carrying out a vacuum treatment such as this, there is no particular restriction on the treatment apparatus. For example, it is possible to use a reactor equipped with a vacuum device or an extruder equipped with a vacuum device.

In cases where a reactor is used, this may be either a vertical tank-type reactor or a horizontal tank-type reactor, although the use of a horizontal tank-type reactor is preferable.

When vacuum treatment is carried out in a reactor like the above, this should be carried out at a pressure of 0.05–750 mmHg, and preferably 0.05–5 mmHg.

When this type of vacuum treatment is carried out using an extruder, it should be conducted for a period of from 10 seconds to about 15 minutes; when it is carried out using a reactor, it should be conducted for a period of from 5 minutes to about 3 hours. It is preferable that vacuum treatment be carried out at a temperature of about 240°–350° C.

In cases where vacuum treatment is carried out in an extruder, a single-screw extruder or twin-screw extruder equipped with a vent may be used. Pelletization may be conducted while carrying out vacuum treatment in an extruder.

In cases where vacuum treatment is carried out in an extruder, this vacuum treatment is carried out at a pressure of 1–750 mmHg, and preferably 5–700 mmHg.

When vacuum treatment is administered to polycarbonate compositions such as this, polycarbonate compositions having a reduced amount of residual monomers and oligomers can be obtained.

For example, in cases where the polycarbonate resin [A] is prepared by carrying out melt polymerization in which diphenyl carbonate is used as the diester carbonate, by administering vacuum treatment such as that just described on the polycarbonate resin [A] serving as the reaction product, the amount of residual diphenyl carbonate can be reduced.

In the polycarbonate compositions used in this invention, it is preferable that the diphenyl carbonate such as this be present (residually) in an amount of no more than 0.1 part by weight, and preferably no more than 0.01 part by weight, per 100 parts by weight of the polycarbonate resin [A] in the polycarbonate composition.

This sort of vacuum treatment may be administered before addition of the acidic compound and, where necessary, the epoxy compound, to the polycarbonate resin [A].

Advantages of the Invention

The optical polycarbonate resin compositions according to the present invention are formulated with an amount of 0.00001–0.2 part by weight of boron compound [B] per 100 parts by weight of the polycarbonate resin [A] having an intrinsic viscosity of 0.30–0.65 dL/g, as measured in 20° C. methylene chloride.

It is preferable that, along with the boron compound [B], the optical polycarbonate resin compositions according to the present invention be formulated also with an amount of 0.00001–0.2 part by weight of an acidic compound [C] having a pKa value of 3 or less and/or a derivative formed from this acidic compound.

A second optical polycarbonate resin composition according to the present invention is formulated with an amount of a sulfonic acid compound [C−1] having a pKa value of 3 or less and/or a derivative thereof per 100 parts by weight of a polycarbonate resin [A] like that described above.

Because these optical polycarbonate compositions according to the present invention have features such as little coloration during molding, and excellent transparency, heat resistance and water resistance, they are ideally suited for use as optical materials such as optical disk substrates and lenses.

The present invention shall now be illustrated more concretely through the following examples, although it shall be understood that these examples in no way limit the scope of the invention.

In this specification, the intrinsic viscosity [IV], MFR, hue [YI], light transmittance, haze, residence stability and water resistance of the Polycarbonate resin [A] composition are measured as follows.

Intrinsic Viscosity (IV): This was measured using an Ubbelohde viscometer at 20° C. and in methylene chloride.

MFR: This was measured at a temperature of 300° C. and a load of 1.2 kg in general accordance with the method in JIS K-7210.

Hue: An injection-molded sheet having a thickness of 3 mm was molded at a cylinder temperature of 290° C., an injection pressure of 1000 kg/cm$^2$, a cycle time of 45 seconds, and a mold temperature of 100° C. The X, Y and Z values were measured by the transmission method using a Color and Color Difference Meter ND-1001 DP made by Nippon Denshoku Kogyo KK, and the yellow index (YI) was measured.

$$YI = 100(1.277X - 1.060Z)/Y$$

Light Transmittance: Using the injection molded sheet prepared for hue measurement, the light transmittance was measured in accordance with the method in ASTM D 1003.

Haze: The haze of the injection-molded sheet for hue measurement was measured using an NDH-200 made by Nippon Denshoku Kogyo KK.

Residence Stability: After retaining the resin within the cylinder of the injection molding machine for 15 minutes at a temperature of 320° C., injection molding was carried out at that temperature. The MFR, hue (YI) and light transmittance of the molded sheet were measured.

Water Resistance: The injection-molded sheet for hue measurement was immersed in water within an autoclave, and held for 5 days in an oven at 125° C. The haze was measured using this test piece.

Mold Grime: Using a nickel stamper, 5-inch disks were formed in a continuous, 500-shot run at a cylinder temperature of 320° C. a cycle time of 9 seconds, and a mold temperature of 90° C., After this, the stamper was visually examined, then immersed in acetone; 10 cc was measured out and the absorption at a wavelength of 254 nm was measured with a UV detector by means of high-performance liquid chromatography (HPLC) so as to determine the amount of monomer and oligomer present.

End Group Structures

After dissolving 0.4 g of the sample in 3 mL of chloroform, the end group structures and ratios were measured at 40° C. using $^{13}$C—NMR (JEOL Ltd.; GX-270).

EXAMPLE 1

A 250-liter tank-type stirring tank was charged with 0.44 kilomole of bisphenol A (GE Plastics Japan) and 0.46 kilomole of diphenyl carbonate ("Enii"* Co.), and the tank was flushed with nitrogen, following which [the mixture] was melted at 140° C.

*Translator's Note: Proper names for which the English spellings are unconfirmed are enclosed in quotation marks.

Next, the temperature was raised to 180° C., 0.11 mole of triphenylborate was added, and the mixture was stirred for 30 minutes.

Tetramethylammonium hydroxide (0.11 mole) and 0.00044 mole of sodium hydroxide were then added as the catalysts, the temperature was raised to 240° C., and the pressure was lowered at the same time to 30 mmHg. The temperature and pressure were held constant and the amount of phenol distilled off was measured. The moment that phenol stopped being driven off, the pressure was returned to atmospheric pressure with nitrogen. The time required for reaction was two hours.

The intrinsic viscosity [η] of the reaction product obtained was 0.12 dL/g.

Next, this reaction product was pressurized with a gear pump and sent into a centrifugal thin-film evaporator, where the reaction was allowed to proceed. The temperature and pressure of the thin-film evaporator were respectively controlled to 270° C. and 2 mmHg. [The reaction product] was sent at a rate of 40 kg/hour by means of a gear pump from the bottom of the evaporator into a two-shaft horizontal-type stirring polymerization tank (L/D=3; stirring element rotational diameter. 220 mm; capacity, 80 liters) controlled to 280° C., and 0.2 mmHg, and polymerized at a residence time of 30 minutes. The intrinsic viscosity (IV) of the polymer thus obtained was 0.37 dL/g.

The amount of triphenylborate in the polymer was computed from the charged composition. The results are given in Table 1.

EXAMPLE 2

After adding 0.0006 part by weight of a 50% aqueous phosphite solution (0.0003 part by weight as phosphite, 3 ppm/polycarbonate resin [A]) to 100 parts by weight of the polycarbonate resin [A] in Example 1, this was mixed in a single-screw extruder (L/D=31; temperature, 280° C.), thereby giving pellets.

The results are shown in Table 1.

EXAMPLE 3

Bisphenol A (0.44 kilomole; GE Plastics Japan) and 0.45 kilomole of diphenyl carbonate ("Enii" Co.) were charged into a 250-liter tank-like stirring tank, and the tank was flushed with nitrogen, following which [the mixture] was melted at 140° C.

The temperature was then raised to 180° C., 0.0011 mole of triphenylborate was added, and [the mixture] was mixed for 30 minutes.

Next, 0.11 mole of tetramethylammonium hydroxide and 0.00044 mole of sodium hydroxide were added as the catalysts, the temperature was raised to 240° C. and the pressure was gradually lowered at the same time to 30 mmHg. The amount of phenol driven off while holding the temperature and pressure constant was measured. The moment that phenol stopped being driven off, the pressure was returned to atmospheric pressure with nitrogen. The time required for reaction was two hours. The intrinsic viscosity [η] of the reaction product thus obtained was 0.12 dL/g.

Next, this reaction product was pressurized with a gear pump and sent into a centrifugal thin-film evaporator, where the reaction was allowed to proceed. The temperature and pressure of the thin-film evaporator were respectively controlled to 295° C. and 2 mmHg. [The reaction product] was sent at a rate of 40 kg/hour by means of a gear pump from the bottom of the evaporator into a two-shaft horizontal-type stirring polymerization tank (L/D=3; stirring element rotational diameter, 220 mm; capacity, 80 liters) controlled to 300° C. and 0.2 mmHg, and polymerized at a residence time of 30 minutes.

The intrinsic viscosity (IV) of the polymer thus obtained was 0.54 dL/g.

After adding 0.0006 part by weight of a 50% aqueous phosphite solution (0.0003 part by weight as phosphite, 3 ppm/polycarbonate resin [A]) to 100 parts by weight of this polycarbonate resin [A], [these components] were mixed with a single-screw extruder (temperature, 280° C.) by the same method as in Example 2, thereby giving pellets.

The results are shown in Table 1.

EXAMPLES 4-5

Pellets were prepared by the same method as in Example 3, except that the compounds cited in Table were used in the indicated amounts as the acidic compound in Example 3.

The results are shown in Table 1.

EXAMPLE 6

Pellets were obtained in the same manner as in Example 3, except that the triphenylborate and p-toluenesulfonic acid used in Example 3 were added in the amounts indicated in Table 3.

The results are shown in Table 1.

COMPARATIVE EXAMPLE 1

Polymer was prepared by the same method as that described in Example 1, except that triphenylborate was not used.

The results are shown in Table 1.

COMPARATIVE EXAMPLE 2

Polymer was prepared by the same method as that described in Example 3, except that triphenylborate and phosphorous acid were not used.

The results are shown in Table 1.

TABLE 1

|  | Exam. 1 | Exam. 2 | Exam. 3 | Exam. 4 | Exam. 5 | Exam. 6 | Comp. Ex. 1 | Comp. Ex. 2 |
| --- | --- | --- | --- | --- | --- | --- | --- | --- |
| Boron compound |  |  |  |  |  |  |  |  |
| Type | TBP | TBP | TBP | TBP | TBP | TBP | — | — |
| Amount (ppm) | 30 | 30 | 3 | 3 | 3 | 20* | 0 | 0 |
| Phosphorous compound |  |  |  |  |  |  |  |  |
| Type | — | PA | PA | PA | — | — | — | — |
| Amount (ppm) | 0 | 3 | 3 | 10 | 0 | 0 | 0 | 0 |
| Sulfonic acid compound |  |  |  |  |  |  |  |  |
| Type | — | — | — | — | PTS | PTS | — | — |
| Amount (ppm) | 0 | 0 | 0 | 0 | 2 | 2 | 0 | 0 |
| Initial Properties |  |  |  |  |  |  |  |  |
| Intrinsic vicosity [η] (dL/g) | 0.37 | 0.36 | 0.54 | 0.54 | 0.54 | 0.54 | 0.37 | 0.55 |
| MFR (g/10 min) | 55 | 60 | 6.5 | 6.4 | 6.3 | 6.4 | 58 | 6.0 |
| Hue (YI) | 1.1 | 1.0 | 1.6 | 1.8 | 1.6 | 1.6 | 1.4 | 1.9 |
| Light transmittance (%) | 90.8 | 90.8 | 90.6 | 90.3 | 90.6 | 90.5 | 90.6 | 90.5 |
| Haze | 0.4 | 0.3 | 0.4 | 0.5 | 0.3 | 0.3 | 0.5 | 0.6 |
| Residence Stability |  |  |  |  |  |  |  |  |
| MFR (g/10 min) | 65.3 | 67.8 | 7.1 | 7.1 | 6.9 | 7.0 | 72 | 7.5. |
| MFR rise ratio (%) | 18.7 | 13.0 | 9.2 | 10.9 | 9.5 | 9.4 | 24.1 | 25.0 |
| Hue (YI) | 1.6 | 1.2 | 1.8 | 2.1 | 1.8 | 1.8 | 2.5 | 2.8 |
| Light transmittance (%) | 90.7 | 90.7 | 90.4 | 90.0 | 90.4 | 90.4 | 90.3 | 90.3 |
| Water resistance | 13 | 14 | 14 | 85 | 15 | 17 | 3 | 5 |

TABLE 1-continued

|  | Exam. 1 | Exam. 2 | Exam. 3 | Exam. 4 | Exam. 5 | Exam. 6 | Comp. Ex. 1 | Comp. Ex. 2 |
|---|---|---|---|---|---|---|---|---|
| (haze) | (MC) | (MC) |  |  |  |  | (MC) |  |

TPB = triphenylborate;
PA = phosphorous cid;
PTS = p-toluenesulfonic acid
*(3 + 17)17 ppm was mixed with an extruder
MC = many cracks

EXAMPLE 7

Bisphenol A (0.44 kilomole; GE Plastics Japan) and 0.46 kilomole of diphenyl carbonate ("Enii" Co.) were charged into a 250-liter tank-like stirring tank, and the tank was flushed with nitrogen, following which [the mixture] was melted at 140° C.

The temperature was then raised to 180° C., 0.11 mole ($2.5 \times 10^{-4}$ mole/mole of bisphenol A) of tetramethylammonium hydroxide and 0.00044 mole ($1 \times 10^{-6}$ mole/mole of bisphenol A) were added as catalysts, and the mixture was stirred for 30 minutes.

Next, the temperature was raised to 210° C. and the pressure was gradually lowered at the same time to 200 mmHg; after 30 minutes, the temperature was raised to 240° C. and the pressure was gradually lowered at the same time to 15 mmHg. The amount of phenol driven off while holding the temperature and pressure constant was measured. The moment that phenol stopped being driven off, the pressure was returned to atmospheric pressure with nitrogen. The time required for reaction was one hour. The intrinsic viscosity [$\eta$] of the reaction product thus obtained was 0.12 dL/g.

Next, this reaction product was pressurized with a gear pump and sent into a centrifugal thin-film evaporator, where the reaction was allowed to proceed. The temperature and pressure of the thin-film evaporator were respectively controlled to 270° C. and 2 mmHg. [The reaction product] was sent at a rate of 40 kg/hour by means of a gear pump from the bottom of the evaporator into a two-shaft horizontal-type stirring polymerization tank (L/D=3; stirring element rotational diameter, 220 mm; capacity, 80 liters) controlled to 280° C. and 0.2 mmHg, and polymerized at a residence time of 30 minutes.

Next, this polymer was sent in molten form by means of the gear pump to a twin-screw extruder (L/D=17.5; barrel temperature, 280° C.), where 2 ppm of butyl p-toluenesulfonate was kneaded with respect to the resin. This was passed through a die and formed into strands, then cut into pellets with a cutter.

The intrinsic viscosity (IV) of the polymer thus obtained was 0.36 dL/g. The results are given in Table 2.

EXAMPLES 8-13

Pellets were obtained by the same method as in Example 7, except that the type and amount of catalysts and the type and amount of additives cited in Table 2 were used.

The results are shown in Table 2.

Polymerization was carried out [in the same manner as in Example 7], except that in Examples 9-12 the final polymerization temperature was changed from 280° C. to 282° C., and in Example 13 the final polymerization temperature was changed from 280° C. to 283° C.

The amounts of the additives and catalysts in the polymer were computed from the charged composition.

EXAMPLE 14

Bisphenol A (0.44 kilomole; GE Plastics Japan) and 0.46 kilomole of diphenyl carbonate ("Enii" Co.) were charged into a 250-liter tank-like stirring tank, and the tank was flushed with nitrogen, following which [the mixture] was melted at 140° C.

The temperature was then raised to 180° C., 0.11 mole of triphenylborate was added, and [the mixture] was mixed for 30 minutes. Next, 0.11 mole ($2.5 \times 10^{-4}$ mole/mole of bisphenol A) of tetramethylammonium hydroxide and 0.00044 mole ($1 \times 10^{-6}$ mole/mole of bisphenol A) were added, and [the mixture] was stirred for 30 minutes.

Next, the temperature was raised to 210° C. and the pressure was gradually lowered at the same time to 200 mmHg; after 30 minutes, the temperature was raised to 240° C. and the pressure was gradually lowered at the same time to 15 mmHg. The amount of phenol driven off while holding the temperature and pressure constant was measured. The moment that phenol stopped being driven off, the pressure was returned to atmospheric pressure with nitrogen. The time required for reaction was one hour. The intrinsic viscosity [$\eta$] of the reaction product thus obtained was 0.15 dL/g.

Next, this reaction product was pressurized with a gear pump and sent into a centrifugal thin-film evaporator, where the reaction was allowed to proceed. The temperature and pressure of the thin-film evaporator were respectively controlled to 270° C. and 2 mmHg. [The reaction product] was sent at a rate of 40 kg/hour by means of a gear pump from the bottom of the evaporator into a two-shaft horizontal-type stirring polymerization tank (L/D=3; stirring element rotational diameter, 220 mm; capacity, 80 liters) controlled to 280° C. and 0.2 mmHg, and polymerized at a residence time of 30 minutes.

After this, 2 ppm of butyl p-toluenesulfonate was added, and stirring was continued for another 30 minutes at 280° C. and 0.2 mmHg (vacuum treatment).

The intrinsic viscosity (IV) of the polymer obtained was 0.36 dL/g.

EXAMPLE 15

In Example 14, after adding 2 ppm of butyl p-toluenesulfonate and administering vacuum treatment, this polymer was sent in a molten state to a twin-screw extruder (L/D=17.5; barrel temperature, 285° C.) by means of a bear pump, where a phosphorus compound and an epoxy compound were kneaded into the resin in the amounts indicated in Table 2. [The resulting mixture] was passed through a die and formed into a strand, and cut into pellets with a cutter.

The intrinsic viscosity (IV) of the polymer thus obtained was 0.36 dL/g. The results are shown in Table 2.

EXAMPLE 16

Pellets were obtained by the same method as in Example 11, except that, when charging the bisphenol A and diphenyl carbonate, 0.022 kilomole of p-cumylphenol (Mitsui Texaco) was charged, and the final polymerization temperature was set at 287° C.

The results are shown in Table 2.

EXAMPLE 17

Pellets were obtained by the same method as in Example 16, except that 0.022 kilomole of 2,2,4-trimethyl-4-(4-hydroxyphenyl)chroman (GE Plastics Japan; "Chroman" I) was charged instead of p-cumylphenol.

The results are shown in Table 2.

EXAMPLES 18-21

Mold grime tests were conducted using the resin compositions obtained in Examples 11, 12, 15 and 17.

The results are shown in Table 3.

REFERENCE EXAMPLE 1

Additives like those shown in Table 2 were compounded, in the amounts indicated in Table 2, into a polycarbonate powder (IV, 0.36 dL/g) obtained by the phosgene process and using phenol made by GE Plastics Japan as the end sealing agent. [The mixture] was kneaded in a single-screw extruder (L/D=31; temperature, 280° C.), and pellets were obtained.

The results are shown in Table 2.

REFERENCE EXAMPLE 2

A mold grime test was carried out using the resin composition in Reference Example 1.

The results are shown in Table 3.

TABLE 2

|  | Example 7 | Example 8 | Example 9 | Example 10 | Example 11 | Example 12 |
|---|---|---|---|---|---|---|
| Catalysts | | | | | | |
| (a) NaOH amount ($10^{-6}$ mole/BPA) | 1.0 | 1.0 | 1.0 | 1.0 | 1.0 | 1.0 |
| (b) Me$_4$NOH amount ($10^{-4}$ mole/BPA) | 2.5 | 2.5 | 2.5 | 2.5 | 2.5 | 2.5 |
| End group structure | H/P | H/P | H/P | H/P | H/P | H/P |
| End of group ratio (%) | 6/94 | 6/94 | 5/95 | 6/94 | 6/94 | 5/95 |
| Boron compound | | | | | | |
| Type | — | — | TPB | TPB | TPB | — |
| Amount (ppm) | — | — | 30 | 30 | 30 | — |
| Acidic compound | | | | | | |
| Type | BPTS | PTS | BPTS | BPTS | BPTS | BPTS |
| Amount (ppm) | 2 | 2 | 2 | 2 | 2 | 2 |
| Phosphorus compound (ppm) Tris(2,4-di-t-butyl-phenyl)phosphite | — | — | — | 300 | 300 | 300 |
| Epoxy compound (ppm) "Celloxide" 2021 P (Daicel) | — | — | — | — | 300 | 300 |
| Initial Properties | | | | | | |
| IV (dL/g) | 0.36 | 0.36 | 0.36 | 0.36 | 0.37 | 0.36 |
| MFR (g/10 min) | 57 | 58 | 57 | 57 | 55 | 57 |
| Hue (YI) | 1.2 | 1.2 | 1.0 | 1.0 | 1.0 | 1.1 |
| Light transmittance (%) | 90.8 | 90.8 | 90.8 | 90.8 | 90.8 | 90.8 |
| Haze | 0.3 | 0.3 | 0.3 | 0.3 | 0.3 | 0.3 |
| Residence Stability | | | | | | |
| MFR (g/10 min) | 61 | 63 | 60 | 60 | 58 | 60 |
| MFR rise ratio (%) | 7 | 8 | 6 | 5 | 5 | 6 |
| Hue (YI) | 1.3 | 1.3 | 1.2 | 1.2 | 1.2 | 1.2 |
| Light transmittance (%) | 90.7 | 90.7 | 90.7 | 90.7 | 90.7 | 90.7 |
| Water resistance haze | 8 | 7 | 8 | 25 | 4 | 4 |

|  | Example 13 | Example 14* | Example 15* | Example 16 | Example 17 | Comp. Ex. 1 |
|---|---|---|---|---|---|---|
| Catalysts | | | | | | |
| (a) NaOH amount ($10^{-6}$ mole/BPA) | 0.4 | 1.0 | 1.0 | 1.0 | 1.0 | — |
| (b) Me$_4$NOH amount ($10^{-4}$ mole/BPA) | 2.5 | 2.5 | 2.5 | 2.5 | 2.5 | — |
| End group structure | H/P | H/P | H/P | H/P/CP | H/P/C | H/P |
| End of group ratio (%) | 5/95 | 5/95 | 5/95 | 4/51/45 | 2/45/53 | 1/99 |
| Boron compound | | | | | | |
| Type | — | TPB | TPB | TPB | TPB | TPB |
| Amount (ppm) | — | 30 | 30 | 30 | 30 | 30 |
| Acidic compound | | | | | | |
| Type | BPTS | BPTS | BPTS | BPTS | BPTS | BPTS |
| Amount (ppm) | 1 | 2 | 2 | 2 | 2 | 2 |
| Phosphorus compound (ppm) Tris(2,4-di-t-butyl-phenyl)phosphite | — | — | 300 | 300 | 300 | 300 |
| Epoxy compound (ppm) "Celloxide" 2021 P (Daicel) | — | — | 300 | 300 | 300 | 300 |
| Initial Properties | | | | | | |
| IV (dL/g) | 0.36 | 0.37 | 0.36 | 0.37 | 0.36 | 0.36 |
| MFR (g/10 min) | 58 | 54 | 57 | 55 | 58 | 58 |

TABLE 2-continued

| Hue (YI) | 1.0 | 1.3 | 1.2 | 1.4 | 1.3 | 1.4 |
|---|---|---|---|---|---|---|
| Light transmittance (%) | 90.8 | 90.8 | 90.8 | 90.8 | 90.8 | 90.8 |
| Haze | 0.3 | 0.3 | 0.3 | 0.3 | 0.3 | 0.3 |
| Residence Stability | | | | | | |
| MFR (g/10 min) | 59 | 58 | 60 | 58 | 61 | 64 |
| MFR rise ratio (%) | 2 | 7 | 5 | 6 | 6 | 11 |
| Hue (YI) | 1.1 | 1.4 | 1.3 | 1.5 | 1.4 | 1.6 |
| Light transmittance (%) | 90.7 | 90.7 | 90.7 | 90.7 | 90.7 | 90.7 |
| Water resistance haze | 1 | 8 | 4 | 5 | 7 | 9 |

*Vacuum treatment
H/P = hydroxyl group/phenoxy group;
H/P/CP = hydroxyl group/phenoxy group/p-cumylphenoxy group;
H/P/C = hydroxyl group/phenoxy group/coumarin group;
TPB = triphenylborate;
BPTS = butyl p-toluenesulfonate
PTS = p-toluenesulfonic acid

TABLE 3

|  | Example 18 | Example 19 | Example 20 | Example 21 | Comp. Ex. 2 |
|---|---|---|---|---|---|
| Resin used | Example 11 | Example 12 | Example 15 | Example 17 | Comp. Ex. 1 |
| Mold grime | | | | | |
| Visual (stamper edge portion) | SC | SC | NC | ANC | cloudy |
| Total amount of monomer and polymer (surface ratio) | 10 | 12 | 2 | 5 | 100 |

SC = slightly cloudy;
NC = no change whatsoever;
ANC = almost no change

We claim:

1. An optical polycarbonate composition comprising (A) a polycarbonate resin having an intrinsic viscosity of about 0.30–0.65 dL/G as measured in 20° C. methylene chloride; and (B) a boron compound comprising about 0.00001–0.2 parts by weight per 100 parts by weight of said polycarbonate resin.

2. A composition according to claim 1 wherein said polycarbonate resin is the product of the melt polycondensation of an aromatic organic dihydroxy compound with a diester carbonate.

3. A composition according to claim 2 wherein said melt polycondensation is carried out in the presence of catalyst selected from the group comprising alkali and alkaline earth metal compounds.

4. A composition according to claim 3 wherein said catalyst comprises from about $1 \times 10^{-8}$ to about $1 \times 10^{-3}$ moles per mole of aromatic organic hydroxy compound.

5. A composition according to claim 1, wherein said polycarbonate resin contains end groups selected from the group comprising hydroxyl, phenoxy, p-tert-butylphenoxy, p-cumylphenoxy and chromanylphenoxy.

6. A composition according to claim 5, wherein the aromatic rings or chromanyl groups of said phenoxy, p-tert-butylphenoxy, p-cumylphenoxy and chromanylphenoxy groups may be substituted with halogens or alkyl groups having 1–9 carbons.

7. A composition according to claim 1, wherein said boron compound is selected from the group of compounds having the formula $$B(OR^3)_n(OH)_{3-n}$$

where $R^3$ is hydrogen, an aliphatic hydrocarbon, an alicyclic hydrocarbon or an aromatic hydrocarbon; and n is 1, 2 or 3.

8. A composition according to claim 1 further comprising an acidic compound having a pKa value of 3 or less or a derivative of said acidic compound, in an amount of from about 0.00001 to about 0.2 parts by weight per 100 parts by weight of said polycarbonate resin.

9. A composition according to claim 8, wherein said acidic compound is a sulfonic acid compound or derivative thereof comprising from about 0.00001 to about 0.0005 parts by weight per 100 parts by weight of said polycarbonate resin.

10. A composition according to claim 9, wherein said sulfonic acid compound is selected from the group of compounds having the formula $$(R^6)_n\text{—}\bigcirc\text{—}SO_3R^1$$

where $R^0$ is a hydrocarbon or halogen-substituted hydrocarbon having 1–20 carbon atoms, $R^1$ is hydrogen or a hydrocarbon or halogen-substituted hydrocarbon having 1–50 carbon atoms, and n is an integer from 0 to 3.

11. A composition according to claim 10 wherein said sulfonic acid compound is selected from the group comprising benzenesulfonic acid, p-toluenesulfonic acid and the methyl, ethyl, butyl or octyl esters thereof.

12. A composition according to claim 1 further comprising aphosphorus compound.

13. A composition according to claim 12 wherein said phosphorus compound comprises about 0.1 parts by weight or less per 100 parts by weight of said polycarbonate resin.

14. A composition according to claim 12 wherein said phosphorus compound is selected from the group comprising compounds of the formula $$P(OR)_3$$

where R may be aliphatic, alicyclic or aromatic hydrocarbon.

15. A composition according to claim 1 further comprising an epoxy compound.

16. A composition according to claim 15 wherein said epoxy compound comprises from about 0.001 to about 0.1 parts by weight per 100 parts by weight of said polycarbonate resin.

17. An optical polycarbonate composition comprising:
   (A) approximately 100 parts by weight of a polycarbonate resin having an intrinsic viscosity of about 0.30–0.65 dL/g as measured in 20° C. methylene chloride;
   (B) from about 0.00001 to about 0.2 parts by weight of a boron compound;
   (C) from about 0.00001 to about 0.2 parts by weight of an acidic compound having pKa of 3 or less;
   (D) from about 0.1 parts by weight or less of a phosphorus compound; and
   (E) from about 0.001 to about 0.1 parts by weight of an epoxy compound.

* * * * *